United States Patent
Super et al.

(10) Patent No.: US 8,494,224 B2
(45) Date of Patent: Jul. 23, 2013

(54) PERSPECTIVE IMPROVEMENT FOR IMAGE AND VIDEO APPLICATIONS

(75) Inventors: Boaz J. Super, Westchester, IL (US); Bruce A. Augustine, Lake in the Hills, IL (US); James E. Crenshaw, Palatine, IL (US); Evan A. Groat, Lansdale, PA (US); Michael S. Theims, Elgin, IL (US)

(73) Assignee: Motorola Mobility LLC, Libertyville, IL (US)

( * ) Notice: Subject to any disclaimer, the term of this patent is extended or adjusted under 35 U.S.C. 154(b) by 0 days.

(21) Appl. No.: 13/041,486

(22) Filed: Mar. 7, 2011

(65) Prior Publication Data

US 2011/0169986 A1   Jul. 14, 2011

Related U.S. Application Data

(62) Division of application No. 11/380,196, filed on Apr. 25, 2006, now Pat. No. 7,742,624.

(51) Int. Cl.
| | |
|---|---|
| *G06K 9/00* | (2006.01) |
| *G01C 3/00* | (2006.01) |
| *H04N 5/228* | (2006.01) |
| *H04N 5/222* | (2006.01) |

(52) U.S. Cl.
USPC .......... 382/106; 382/100; 356/3; 348/208.15; 348/333.04

(58) Field of Classification Search
None
See application file for complete search history.

(56) References Cited

U.S. PATENT DOCUMENTS

| | | | |
|---|---|---|---|
| 5,193,124 A | 3/1993 | Subbarao | |
| 5,687,249 A | 11/1997 | Kato | |
| 5,745,668 A * | 4/1998 | Poggio et al. | 345/475 |
| 6,195,119 B1 | 2/2001 | Dianna et al. | |
| 6,262,743 B1 | 7/2001 | Allio | |
| 6,288,689 B1 * | 9/2001 | Shikama | 345/7 |
| 6,330,486 B1 * | 12/2001 | Padula | 700/94 |
| 6,400,848 B1 | 6/2002 | Gallagher | |

(Continued)

FOREIGN PATENT DOCUMENTS

| | | |
|---|---|---|
| EP | 1 376 467 A2 | 1/2004 |
| EP | 1 482 450 A1 | 12/2004 |

OTHER PUBLICATIONS

Ngo et al. "A Pipelined Architecture for Real-Time Correction of Barrel Distortion in Wide-Angle Camera Images" Mar. 2005, IEEE Transactions on Circuits and Systems for Video Technology, vol. 15, No. 3, 436-444.*

(Continued)

*Primary Examiner* — Randolph I Chu

(57) ABSTRACT

A system and method for reducing distance-based distortion in a camera image of an object, where the distanced-based distortion is due to differences in distance from the camera to different parts of the object. In one approach, the distortion is reduced by estimating distances to different parts of the object and then generating a reprojected image of the object dependent upon the estimated distances and upon a virtual viewpoint that is more distant than the camera from the object. In a further approach, the image is warped such that points in the image match corresponding points in one or more stored templates. In a still further approach, if excessive distortion is present in the image, the camera zoom is increased and a magnified image is displayed, prompting a person to move farther from the camera thereby reducing the distortion.

6 Claims, 5 Drawing Sheets

U.S. PATENT DOCUMENTS

| | | | |
|---|---|---|---|
| 6,641,053 B1 | 11/2003 | Breidenbach et al. | |
| 7,058,237 B2* | 6/2006 | Liu et al. | 382/276 |
| 7,084,877 B1* | 8/2006 | Panusopone et al. | 345/474 |
| 7,099,521 B2* | 8/2006 | Liu et al. | 382/276 |
| 7,113,650 B2* | 9/2006 | Liu et al. | 382/276 |
| 7,149,367 B2* | 12/2006 | Cutler | 382/284 |
| 7,184,609 B2* | 2/2007 | Liu et al. | 382/276 |
| 7,327,899 B2* | 2/2008 | Liu et al. | 382/276 |
| 7,432,917 B2* | 10/2008 | Wilson et al. | 345/175 |
| 7,454,054 B2 | 11/2008 | Fukumoto | |
| 7,454,057 B2 | 11/2008 | Tsukioka | |
| 7,603,000 B2* | 10/2009 | Zheng et al. | 382/305 |
| 2002/0130961 A1 | 9/2002 | Lee et al. | |
| 2003/0117675 A1 | 6/2003 | Shirato et al. | |
| 2003/0158701 A1* | 8/2003 | Yasuda et al. | 702/179 |
| 2004/0001146 A1* | 1/2004 | Liu et al. | 348/207.99 |
| 2004/0046888 A1* | 3/2004 | Jan et al. | 348/335 |
| 2004/0201587 A1 | 10/2004 | Mizusawa | |
| 2004/0201768 A1 | 10/2004 | Cahill et al. | |
| 2004/0207743 A1 | 10/2004 | Nozaki et al. | |
| 2004/0211883 A1* | 10/2004 | Imagawa et al. | 250/208.1 |
| 2004/0233543 A1 | 11/2004 | Chang | |
| 2005/0163398 A1 | 7/2005 | Ioka | |
| 2005/0180656 A1* | 8/2005 | Liu et al. | 382/284 |
| 2005/0206659 A1* | 9/2005 | Cutler | 345/660 |
| 2005/0251015 A1 | 11/2005 | Takikawa et al. | |
| 2006/0028735 A1* | 2/2006 | Liu et al. | 359/687 |
| 2006/0268101 A1 | 11/2006 | He et al. | |
| 2007/0242066 A1 | 10/2007 | Levy Rosenthal | |
| 2008/0211956 A1* | 9/2008 | Imada et al. | 348/340 |
| 2008/0212811 A1* | 9/2008 | Kates | 381/312 |
| 2010/0246980 A1* | 9/2010 | Tong et al. | 382/228 |

OTHER PUBLICATIONS

Tian et al. "Study on the Effect of Object to Camera Distance on Polynomial Expansion Coefficients in Barrel Distortion Correction", 2002, Fifth IEEE Southwest Symposium on Image Analysis and Interpretation.*

* cited by examiner

PERSPECTIVE IMPROVEMENT FOR IMAGE AND VIDEO APPLICATIONS

BACKGROUND

Many camera based products, such as videophones, webcams and mobile devices, require wide angle lenses. In order to avoid having their faces look too small, users tend to move their faces close to the camera. As a result, perspective distance effects become large and their faces appear distorted in the image, with large noses and pinched cheeks. Users find this unflattering. This distance-based perspective effect is an undesirable feature of videophone and video email products.

There are other perspective effects such as wide-angle (fish-eye) distortion and oblique distortion (which causes keystoning). Compensation techniques have been proposed for mitigating these effects, but these techniques are not applicable to the type of distortion described above.

BRIEF DESCRIPTION OF THE DRAWINGS

The novel features believed characteristic of the invention are set forth in the appended claims. The invention itself, however, as well as the preferred mode of use, and further objects and advantages thereof, will best be understood by reference to the following detailed description of an illustrative embodiment when read in conjunction with the accompanying drawing(s), wherein:

DETAILED DESCRIPTION

Figure 1:
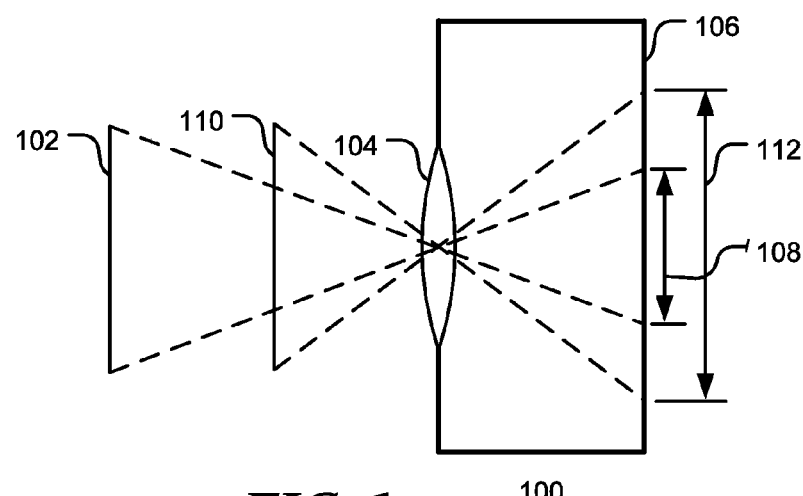
FIG. 1 is a diagram illustrative of the distance-based perspective effect.

While this invention is susceptible of embodiment in many different forms, there is shown in the drawings and will herein be described in detail one or more specific embodiments, with the understanding that the present disclosure is to be considered as exemplary of the principles of the invention and not intended to limit the invention to the specific embodiments shown and described. In the description below, like reference numerals are used to describe the same, similar or corresponding parts in the several views of the drawings.

The distance-based perspective effect is illustrated in the diagram in FIG. 1. FIG. 1 shows a simplified camera 100. Light from an object 102 at a first distance from the camera 100 passes through the lens 104 and falls on sensor array 106 to form an image of height 108. Light from a second object 110 passes through the lens 104 and falls on the sensor array 106 to form an image of height 112. Although objects 102 and 110 are of the same height, the image of the more distant object 102 is much smaller than the image of the closer object 110. Thus, objects (or portions of object) closer to the lens appear disproportionately larger in the image relative to more distant objects. The ratio of image heights depends on the ratio of distances to the lens. Thus for three-dimensional objects, such as faces, the amount of distortion depends on the depth of the object relative to the distance of the object to the camera lens. For many lenses in wide use, the distortion of the image of a face is therefore small when the face is several meters from the camera.

In some video applications, such as video-telephony, the user is able to monitor the image of his or her face that is being transmitted. If the image does not fill the image frame the user is likely to move closer to the camera. This is especially true if the camera uses a wide angle lens. The result is that the image of the user's face, while filling more of the image frame, becomes distorted due to the distance-based perspective effect. The resulting image is unflattering, showing an enlarged nose and pinched cheeks.

In the description below, an embodiment is described in which the object is a face. However, the invention has application to the reduction of distance-based distortion in images of other objects and images of multiple objects.

Figure 2:
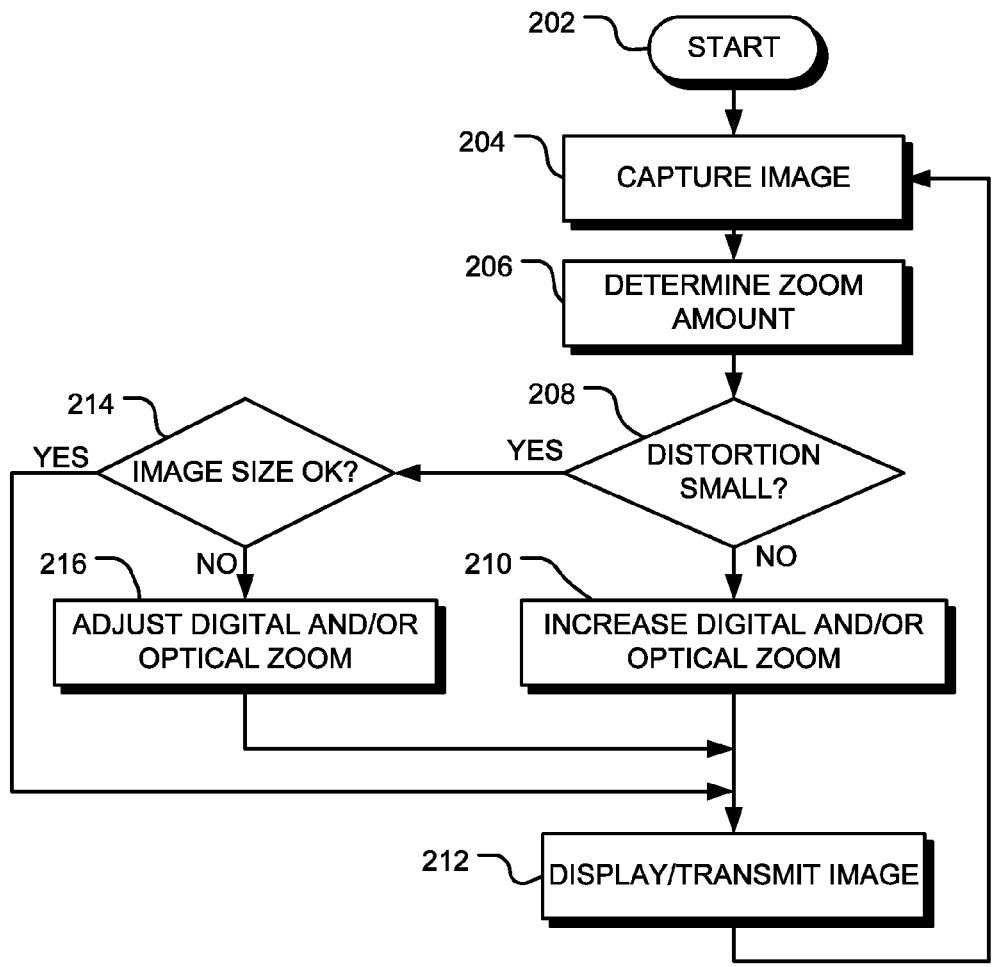
FIG. 2 is a flow chart of a method consistent with certain embodiments of the present invention.

FIG. 2 is a flow chart of a method consistent with certain embodiments of the present invention. Referring to FIG. 2, following start block 202, an image of a user is captured by a camera at block 204. At block 206, an amount of camera zoom required is determined. The amount of camera zoom is determined such that when the user is sufficiently far from the camera that distance-based perspective distortion is acceptably small, the image of the user's face fills a significant portion of the image frame. If the distortion is not acceptably small, as depicted by the negative branch from decision block 208, the zoom is increased at block 210 and a new image is displayed at block 212. The zoom may be a digital zoom, an optical zoom or a combination thereof. The increased amount of zoom causes the image of the user's face to appear too large for the image frame, thus prompting the user to move away from the camera. The amount of zoom may be determined by standard distance measuring systems. These include, for example, active systems that use infrared or ultrasonic waves to determine the distance to the user, or passive systems based on the size of the image of user's face (taking into account the current zoom), stereo images, or some other feature. If the distortion is acceptably small (for example, if the user is at a sufficient distance from the camera), as depicted by the positive branch from decision block 208, the image size is checked at block 214. If the image size is not too large or too small, no further adjustment of the zoom is required. Flow continues to block 212 and the image is displayed. If image size is too large or too small, as depicted by the negative branch from decision block 214, the zoom is adjusted at block 216 to provide the correct size and a new image is displayed at block 212.

In this way, the image size is adjusted so the user is not prompted to move closer to the camera. If the user is too close to the camera, so that distance based distortion is unacceptably larger, the zoom is increased so that image of the user's face appears too large for the image frame, prompting the user to move farther from the camera, thereby reducing the distance-based distortion.

The region of the image corresponding to the user's face may be identified so that the camera can zoom in on this region. Methods of identifying a user's face are well known in the art. The region may be identified and tracked as the user moves, using techniques well known in the art.

Figure 3:
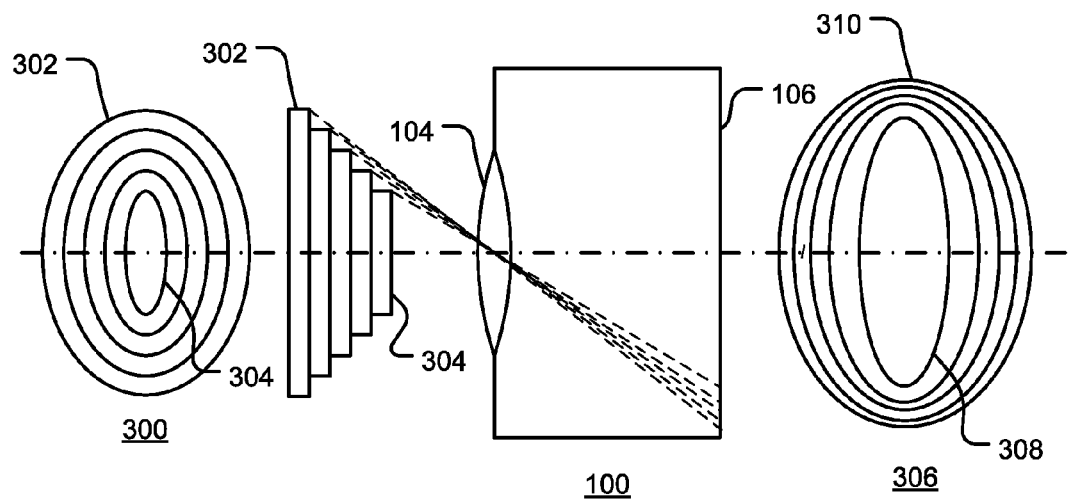
FIG. 3 is a further diagram illustrative of distance-based distortion.

FIG. 3 is a diagram illustrating distance-based distortion. The object is a stack of elliptical discs, shown in frontal view in view 300 with no distance-based distortion. The large disc 302 is farthest from the lens 104 of the camera 100 and small disc 304 is closest to the lens 104. View 306 is a view of the image of the stack formed on the image array 106. The image 308 of the smallest (closest) disc is increased in size relative to the image 310 of the largest (farthest) disc. A corresponding effect occurs with the image of a face close to the camera.

If the distance from the lens 104 to a disc is known, the image of the disc can be modified in size to compensate for the distance-based distortion. This same approach may be used with an image such as a face.

Figure 4:
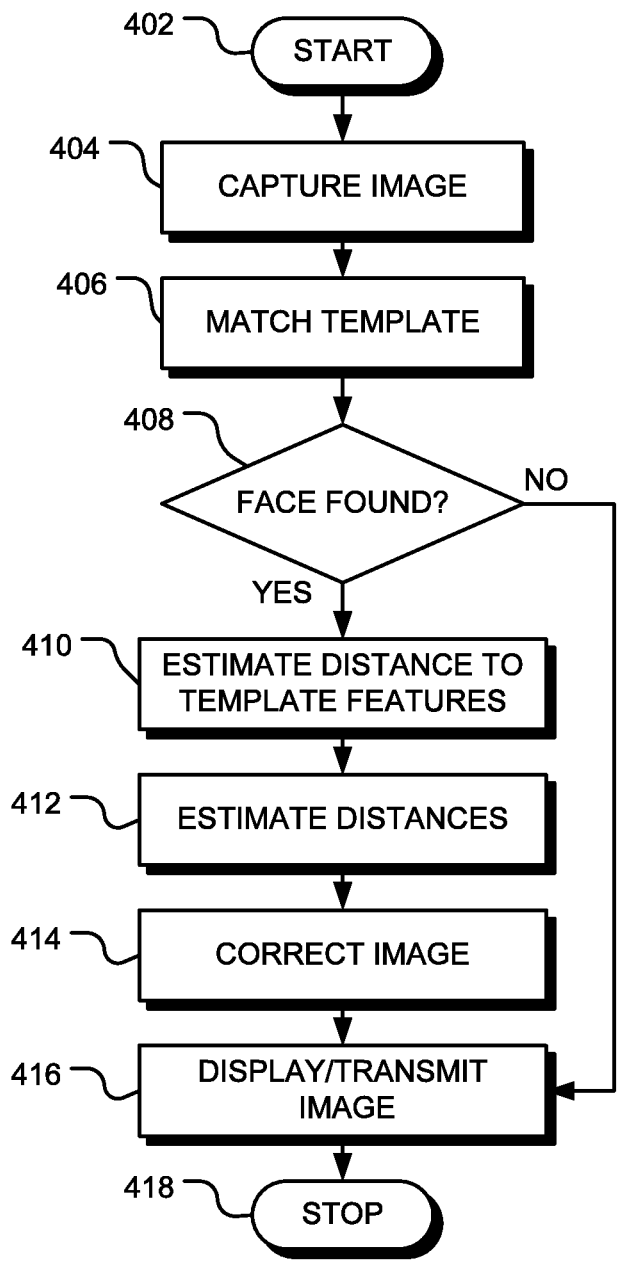
FIG. 4 and FIG. 5 are flow charts of further methods consistent with certain embodiments of the present invention.

For a given object surface, the distance d from the camera lens along the optical axis is a function of the x and y coordinates in a plane perpendicular to the optical axis, so d=d(x, y). Light at position (x, y, d) meets the image sensor array at a position $$(x', y') = \left(\frac{\alpha x}{d(x, y)}, \frac{\alpha y}{d(x, y)}\right),$$

where α is a parameter dependent upon the optical characteristics (such as the magnification) of the camera. The parameter α may be determined by calibration. The image at position (x',y') on the sensor array corresponds to an object point at a distance $$d_i(x', y') = d_i\left(\frac{\alpha x}{d(x, y)}, \frac{\alpha y}{d(x, y)}\right)$$

from the camera. If the distance $d_i(x',y')$ is known, a pixel value $p_{corrected}$ in a corrected image may be calculated from a pixel value $p_{image}$ in the captured image as $$p_{corrected}\left(x'\frac{d_i(x', y')}{\beta}, y'\frac{d_i(x', y')}{\beta}\right) = p_{image}(x', y'),$$

where β is a scale factor. In one embodiment, the scale factor β is a constant. The constant may be proportional to the mean value of d(x,y) or the root mean square value of d(x,y), for example. In another embodiment, the scale factor $\beta=\gamma[d_0+d_i(x',y')]$ where $d_0$ is a constant distance and γ is a scale factor. In this embodiment, a reprojected or virtual image in obtained for which the face appears a distance $d_0$ farther from the camera. In other words, a reprojected image of the object is generated that is dependent upon the estimated distances and upon a virtual viewpoint that is more distant than the camera from the object. A flow chart of an exemplary method for estimating the distance d(x,y) is shown in FIG. 4. Following start block 402, an image is captured at block 404. A face template or other model is matched to the image at block 406. A variety of techniques for extracting features and for matching templates or other models are known to those of ordinary skill in the art. The face template may comprise, for example, simple oval shapes for the periphery of the face and the eyes, and a simple nose template. The matching may be performed by use of alignment matching and verification, for example. The matching process results in a set of model parameters. At decision block 408, a decision is made as to whether the image includes a face. If a face is detected, as depicted by the positive path from decision block 408, the distance to one or more matched features of the face is estimated at block 410. The distance may be estimated from the size of the matched templates, the distance between the eyes, or other parameters of the templates. Alternatively, the distance could be determined by an active technique or by stereopsis. In one embodiment, the distances of various parts of the face are estimated from the template parameters at block 412. For example, a table may be accessed that contains typical distances for all regions of a face obtained from anthropological statistics. For example, a point 50% of the distance between the nose and the side of the face and 20% of the distance from the center of the eye to the chin might be 1 inch farther away than the tip of the nose. The distances may be determined for each position in the distorted image or for each position in the undistorted face. Other distance estimating techniques are well known to those of ordinary skill in the art. At block 414, a corrected image is formed using the captured image and the distance estimates for each point in the image. The corrected image is displayed at block 416 and the process terminates at block 418. The process may be repeated for each consecutive image, or it may be performed when a change in face position is detected, or it may be repeated at periodic intervals.

Figure 5:
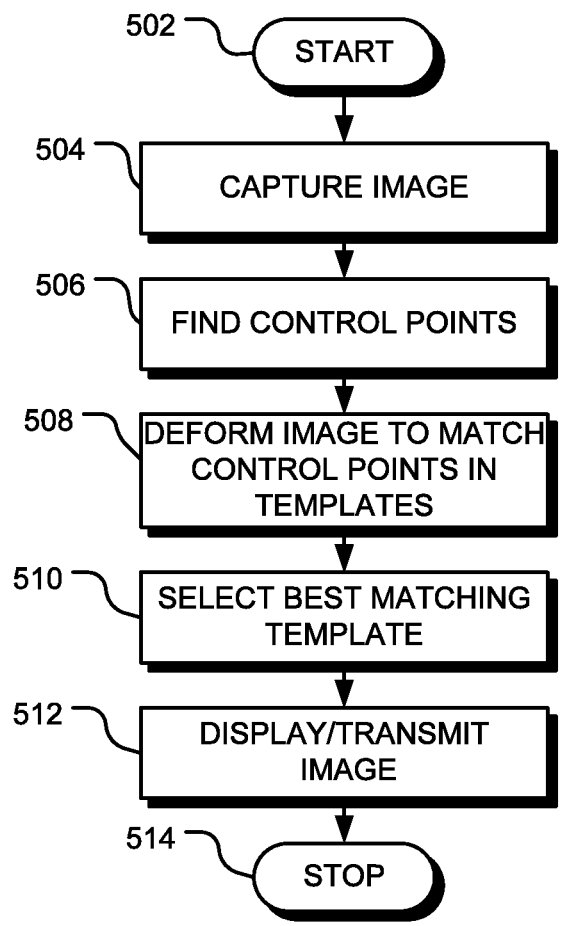

FIG. 5 is a flow chart of a method consistent with certain embodiments of the present invention. This embodiment uses pre-stored templates. The templates are several views of the user photographed from different angles (such as frontal and profile views). Following start block 502 in FIG. 5, an image is captured by the camera at block 504. At block 506 a number of control points or features are identified in the captured image. For example, the position of a corner of an eye may be identified using a method known in the art. The captured image is then warped or morphed to match each template at block 508. This process matches the control points in the captured image to corresponding control points in the templates. At block 510, the best-matching template is selected. This image is displayed, transmitted and/or stored at block 512. The process terminates at block 514. The goodness of a match between the warped image and the template may be measured, for example, as a combination of an amount of deformation and an amount of residual color differences between the warped image and the template, where less deformation, less residual difference, or both correspond to a better match. In an alternative embodiment, the templates are warped to match the image, and the best-matching template is selected. This template may be used as the image to be displayed/stored, or the captured image can be warped to match the selected template. Alternative embodiments will be apparent to those of ordinary skill in the art.

In an alternative embodiment, the position of the image of a person's head is detected using matching to templates or other means known in the art. Then a stored, template-independent, warping transformation is applied to the image of the head. The transformation may be parameterized by the size and orientation of the detected image of the head. For example, a geometric model of head, such as a spherical, cylindrical or ellipsoidal model, may be used. The size of the image of the head is used to estimate the distance of the head from the camera and then the geometric model is used to estimate the variation of distance across the image of the head.

The methods described above with reference to FIGS. 2, 4 and 5 may be used in combination.

Examples of video cameras include a video camera of a videoconferencing system, a videophone, a video email product, a door camera and a security camera. The approach may also be used in still cameras, such as cameras in cellular telephone and other portable electronic devices.

Figure 6:
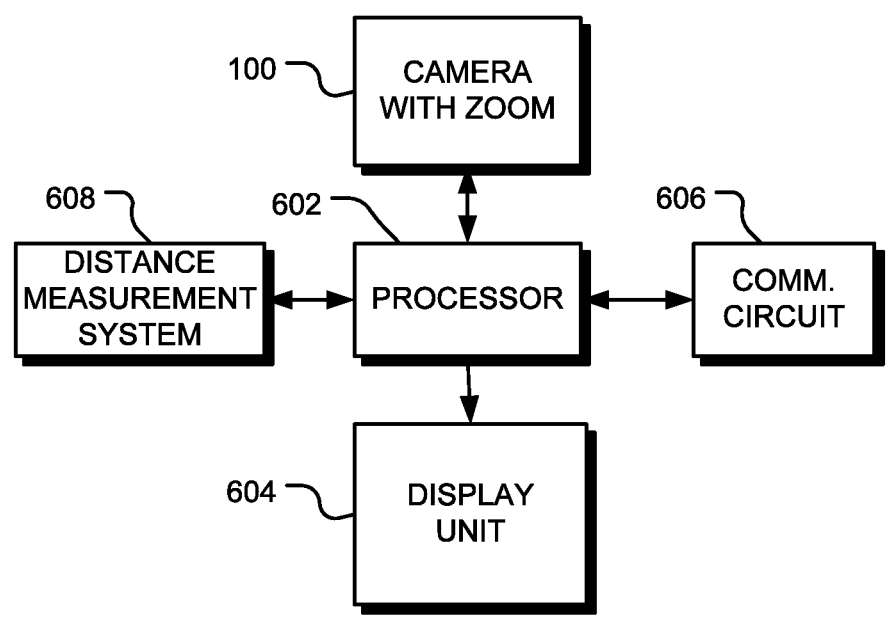
FIG. 6 is a diagrammatic representation of a system consistent with certain embodiments of the invention.

FIG. 6 is a diagrammatic representation of a system consistent with certain embodiments of the invention. Referring to FIG. 6, the system includes a camera 100, which may be a still camera or a video camera. A processor 602 is coupled to the camera 100. The processor 602 may be incorporated in the body of the camera or may be external to the camera and coupled to it by a wired or wireless link. In this embodiment, the processor also communicates with a display 604 and a communication circuit 606. In one embodiment, the processor operates to control the digital or optical zoom of camera 100. Images captured from the camera may be displayed on display unit 604 and/or transmitted via communication circuit 606 to a remote device.

In one embodiment of the invention, the camera 100 is a video camera that captures images of the face of a user in a video conferencing or video telephony system. The display unit 604 displays images of the user and also images received from a remote camera. The processor 602 controls the zoom of camera 100. If the user is so close to the camera that a large amount of distance-based distortion is present in the image, the zoom is controlled such that the image of the user on the display is too large for the display frame, thereby encouraging the user to move farther from the display.

Additionally, the processor 602 may process images captured by the camera to reduce distance-based distortion using the methods described above. This may be done by estimating distances from the camera to the user's face or by matching templates to the image of the user's face. On one embodiment, the distance is estimated using a distance measuring system 608, such an infrared or ultrasonic system. In another embodiment, the distance is estimated using a stereo vision system.

The system shown in FIG. 6 may be incorporated, for example, in a mobile device, such as a radio telephone, or in a fixed device, such as a personal computer.

The present invention, as described in embodiments herein, may be implemented using a programmed processor executing programming instructions that are broadly described above in flow chart form that can be stored on any suitable electronic storage medium. However, those skilled in the art will appreciate that the processes described above can be implemented in any number of variations and in many suitable programming languages without departing from the present invention. For example, the order of certain operations carried out can often be varied, additional operations can be added or operations can be deleted without departing from the invention. Error trapping can be added and/or enhanced and variations can be made in user interface and information presentation without departing from the present invention. Such variations are contemplated and considered equivalent.

Alternatively, the invention may be implemented in hardware.

The programmed processor or hardware may be integral to the camera or may be a separate processor operating on images received from the camera.

While the invention has been described in conjunction with specific embodiments, it is evident that many alternatives, modifications, permutations and variations will become apparent to those of ordinary skill in the art in light of the foregoing description. Accordingly, it is intended that the present invention embrace all such alternatives, modifications and variations as fall within the scope of the appended claims.

What is claimed is:

1. A method for reducing distance-based distortion in an image of an object, the image being captured by a camera, where the distance-based distortion is due to differences in distance from the camera to different parts of the object, the method comprising:

for each template of at least one template of the object, a camera determining a set of parameters that relate points in the image to corresponding points in the template of the object;

selecting by the camera from the set of parameters for each of the at least one template, the set of parameters that results in the best match between the image and the corresponding template; and warping, by the camera, the image using the selected set of parameters.

2. A method in accordance with claim 1, wherein the at least one template of the object comprise a plurality of views of the object.

3. A method in accordance with claim 1, wherein the object is a face and wherein the image comprises an image from a sequence of video images.

4. A method for reducing distortion in an image of a face, the image being captured by a camera, the method comprising:

storing a template of a face;

determining a set of parameters that relate the image to the template of the face;

selecting parameters that results in the best match between the image and the corresponding template;

warping the image using the selected set of parameters; and transmitting the warped image from a video phone or webcam.

5. A method in accordance with claim 4, wherein the template of the face comprises a plurality of views of the face.

6. A method in accordance with claim 1, wherein the object is a face and wherein the image comprises an image from a sequence of video images.

* * * * *